G. T. J. Colburn,
Bird Cage.
No. 98,562. Patented Jan. 4, 1870.
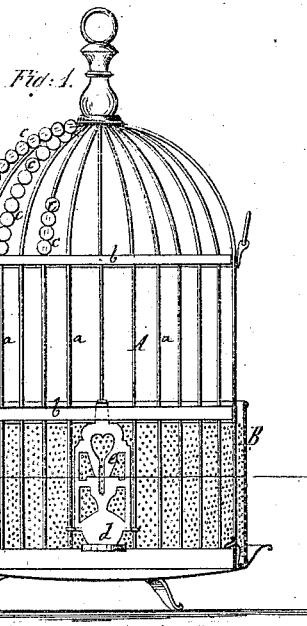
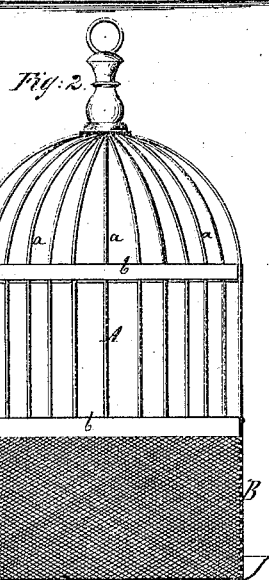
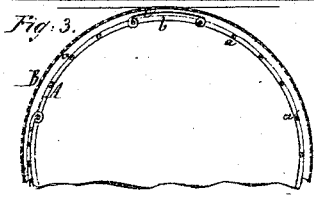
Witnesses. Inventor.

UNITED STATES PATENT OFFICE.

G. F. J. COLBURN, OF NEWARK, NEW JERSEY.

IMPROVED BIRD-CAGE.

Specification forming part of Letters Patent No. 98,562, dated January 4, 1870.

*To all whom it may concern:*

Be it known that I, G. F. J. COLBURN, of Newark, in the county of Essex and State of New Jersey, have invented a new and useful Improvement in Bird-Cages; and I do hereby declare the following to be a full, clear, and exact description thereof, which will enable those skilled in the art to make and use the same, reference being had to the accompanying drawings, forming part of this specification, in which drawings—

Figure 1 represents a vertical central section of this invention. Fig. 2 is a similar section of a modification thereof. Fig. 3 is a horizontal section of the same.

Similar letters indicate corresponding parts.

This invention relates to a bird-cage the rods of which are protected and ornamented by beads strung thereon in such a manner that said rods retain their original flexibility; and, furthermore, by the beads the application of the paint (which is injurious to birds) is obviated, and a bird-cage is obtained of a novel and highly ornamental character. The lower section of my cage, or that section thereof which contains the feed-cups and the door, is surrounded by a fender of perforated sheet metal or wire-gauze, so that the bird is prevented from scattering the seeds or other articles constituting its food on the floor beyond the cage. Said fender is made detached from the body of the cage, and it also serves as a protector, whereby the bird is prevented from escaping if the door of the cage should be accidentally left open.

In the drawings, the letter A designates my bird-cage, which is made of wire rods $a$, secured in rings $b$, of sheet metal or any other suitable material, in the usual manner. On each of the wire rods $a$, I place a series of beads, $c$, sufficient to cover them, so as to give to the same an ornamental appearance, while said rods retain their original flexibility, and can be bent just as easy with the beads on as they can without them; and, furthermore, by the beads the wire rods are protected, so that the operation of painting them can be dispensed with, or that if the wires are painted the bird has no access to them, and the injurious effect of the paint on the bird is prevented.

If desired, the rings $b$ can also be ornamented with beads, either by attaching to them strings of beads or in any other desirable manner. It is obvious that beads of ivory, porcelain, wood, glass, or any other suitable material can be used in ornamenting and covering the wires and the rings.

That section of my cage which contains the feed-cups $d$ and the door $e$ is protected by a fender, B, made of perforated sheet metal, wire-gauze, or of any other suitable material, so that the bird is prevented from scattering the seed or other articles constituting its food on the floor beyond the cage, while said fender is sufficiently translucent to expose the bird to view; and it also does not materially obstruct the access of air to the interior of the cage. At the same time the fender surrounding the section which contains the door forms a protector, whereby the escape of the bird is prevented if the door should be accidentally left open.

What I claim as new, and desire to secure by Letters Patent, is—

1. The removable and detachable fender, in combination with a bird-cage, as set forth.

2. A bird-cage having its wires protected and ornamented by beads of ivory, wood, metal, or other suitable material strung thereon.

G. F. J. COLBURN.

Witnesses:
W. HAUFF,
E. F. KASTENHUBER.